(12) United States Patent
Benjilali et al.

(10) Patent No.: US 12,008,339 B2
(45) Date of Patent: Jun. 11, 2024

(54) PSEUDO-RANDOM PERMUTATION GENERATOR

(71) Applicant: Commissariat à l'Energie Atomique et aux Energies Alternatives, Paris (FR)

(72) Inventors: Wissam Benjilali, Grenoble (FR); William Guicquero, Grenoble (FR)

(73) Assignee: COMMISSARIAT À L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 385 days.

(21) Appl. No.: 17/250,487

(22) PCT Filed: Jul. 31, 2019

(86) PCT No.: PCT/EP2019/070569
§ 371 (c)(1),
(2) Date: Jan. 27, 2021

(87) PCT Pub. No.: WO2020/025649
PCT Pub. Date: Feb. 6, 2020

(65) Prior Publication Data
US 2021/0294575 A1    Sep. 23, 2021

(30) Foreign Application Priority Data

Aug. 3, 2018  (FR) .................................. 1857308
Sep. 5, 2018  (FR) .................................. 1857958

(51) Int. Cl.
*G06F 7/58* (2006.01)
*H03K 3/84* (2006.01)

(52) U.S. Cl.
CPC .............. *G06F 7/582* (2013.01); *H03K 3/84* (2013.01)

(58) Field of Classification Search
CPC ................................................ G06F 7/58–588
See application file for complete search history.

(56) References Cited

U.S. PATENT DOCUMENTS

| 8,510,358 B2 | 8/2013 | Yang et al. |
| 2002/0124033 A1 | 9/2002 | Takahashi |

(Continued)

FOREIGN PATENT DOCUMENTS

EP    2373030 A1 * 10/2011    ............. G06T 9/004

OTHER PUBLICATIONS

A. Orsdemir, H. O. Altun, G. Sharma and M. F. Bocko, "On the security and robustness of encryption via compressed sensing," MILCOM 2008—2008 IEEE Military Communications Conference, San Diego, CA, USA, 2008, pp. 1-7. (Year: 2008).*

(Continued)

*Primary Examiner* — Jyoti Mehta
*Assistant Examiner* — Vivian Diem Ha Ledynh
(74) *Attorney, Agent, or Firm* — Jordan IP Law, LLC

(57) ABSTRACT

The present description concerns a method of generation of a sequence of pseudo-random digital codes enabling to perform a permutation (3) of a first set of values (V) into a second set of values (Vp) based on said digital codes (CPos) representative of positions (j) of values (Vi) of the first set in the second set, including the steps of: generating, by successive iterations, a chain of numbers, called seed numbers, from an initial pseudo-random seed number (W0) by application of a first function (24,26) from a seed number to the next seed number; applying a second function to each seed number of the chain to obtain each position code (CPos(j)), the second function including at least one permutation (PERM) followed by a bijection (BIJ).

20 Claims, 9 Drawing Sheets

(56) References Cited

U.S. PATENT DOCUMENTS

| | | |
|---|---|---|
| 2004/0208321 A1 | 10/2004 | Wary |
| 2006/0120619 A1 | 6/2006 | Avidan et al. |
| 2007/0192389 A1* | 8/2007 | Chang .................... G06F 7/582 |
| | | 708/250 |
| 2019/0182444 A1* | 6/2019 | Allen .................... H04N 25/63 |

OTHER PUBLICATIONS

D. Jayasinghe, R. Ragel, J. A. Ambrose, A. Ignjatovic and S. Parameswaran, "Advanced modes in AES: Are they safe from power analysis based side channel attacks?," 2014 IEEE 32nd International Conference on Computer Design (ICCD), Seoul, Korea (South), 2014, pp. 173-180 (Year: 2014).*

A. J. Menezes, S. A. Vanstone, and P. C. Van Oorschot, Handbook of Applied Cryptography, 1st ed. USA: CRC Press, Inc., 1996. (Year: 1996).*

L. Mintzer, 'Chapter 14—Mechanization of Digital Signal Processors', in Handbook of Digital Signal Processing, D. F. Elliott, Ed. San Diego: Academic Press, 1987, pp. 941-973. (Year: 1987).*

Y. Oike and A. El Gamal, "CMOS Image Sensor With Per-Column $\Sigma\Delta$ ADC and Programmable Compressed Sensing," in IEEE Journal of Solid-State Circuits, vol. 48, No. 1, pp. 318-328, Jan. 2013, doi: 10.1109/JSSC.2012.2214851. (Year: 2013).*

M. Dworkin, "Recommendation for Block Cipher Modes of Operation," 2001, NIST, p. 1-59. (Year: 2001).*

Kawahito, Shoji. "Column-parallel ADCs for CMOS image sensors and their FoM-based evaluations," Jul. 2018, IEICE Transactions on Electronics 101.7 (2018), p. 444-456 (Year: 2018).*

Bakiri (M. Bakiri, J. Couchot, and C. Guyeux, "FPGA Implementation of F2-Linear Pseudorandom Number Generators Based on Zynq MPSoC: a Chaotic Iterations Post Processing Case Study," 2016, arXiv preprint, p. 1-8. (Year: 2008).*

S. Andriani, Machine Translation of EP-2373030-A1, 2011. (Year: 2011).*

J. Duato, S. Yalamanchili, and L. Ni, 'Chapter 1—Introduction', in Interconnection Networks, J. Duato, S. Yalamanchili, and L. Ni, Eds. San Francisco: Morgan Kaufmann, 2003, pp. 1-41. (Year: 2003).*

I. Grout, 'Chapter 5—Introduction to Digital Logic Design', in Digital Systems Design with FPGAs and CPLDs, I. Grout, Ed. Burlington: Newnes, 2008, pp. 217-331. (Year: 2008).*

I. Takayanagi, "CMOS Image Sensors," in Image Sensors and Signal Processing for Digital Still Cameras, CRC Press, 2006, ch. 5, pp. 143-178. (Year: 2006).*

International Preliminary Report on Patentability for International Application No. PCT/EP2019/070569 dated Nov. 5, 2020 6 pages.

Search Report for International Application No. PCT/EP2019/070569 dated Nov. 6, 2019, 3 pages.

M. Francois et al., "Pseudo-random number generator based on mixing of three chaotic maps," Communications in Nonlinear Science and Numerical Simulation, vol. 19, No. 4, Apr. 1, 2014, pp. 887-895.

S.S. Maniccam et al., "Image and video encryption using SCAN patterns," Pattern Recognition, vol. 37, No. 4, Apr. 1, 2004, pp. 725-737.

M.A.B. Younes et al., "An Image Encryption Approach Using a Combination of Permutation Technique Followed by Encryption," IJCSNS International Journal of Computer Science and Network Security, vol. 8, No. 4, Apr. 1, 2008, pp. 191-197.

* cited by examiner

… … …

PSEUDO-RANDOM PERMUTATION GENERATOR

FIELD

The present disclosure generally concerns electronic circuits and systems and, more particularly, circuits using psuedo-random permutations of data that they manipulate.

The present disclosure more particularly concerns a pseudo-random permutation generation method and circuit.

BACKGROUND

Pseudo-random permutations are particularly used in cryptography, in transmissions and in imaging, and existing systems are complex and bulky for systems having strong hardware constraints.

SUMMARY

There is a need for an improved pseudo-random permutation sequence generation mechanism which is simple, compact, easy to achieve and scalable.

An embodiment overcomes all or part of the disadvantages of known pseudo-random permutation generation mechanisms.

An embodiment provides a solution adapted to low-consumption circuits.

An embodiment provides a solution enabling to generate the permutation sequence on the fly.

An embodiment provides a method of generation of a sequence of pseudo-random digital codes enabling to perform a permutation of a first set of values into a second set of values based on said digital codes representative of positions of values of the first set in the second set, comprising the steps of:
  generating, by successive iterations, a chain of numbers, called seed numbers, from an initial pseudo-random seed number by application of a first function from a seed number to the next seed number;
  applying a second function to each seed number of the chain to obtain each position code, the second function comprising at least one permutation followed by a bijection.

An embodiment provides a method of compressive image acquisition from an array image sensor, comprising the steps of:
  sequentially scanning rows of the image sensor to perform a reading of the data per column, each column delivering a voltage and the set of voltages delivered by the columns defining a first set of values;
  submitting the set of voltages delivered by the columns to a pseudo-random permutation to deliver a second set of voltage values,
  the permutation being performed from digital codes representative of positions of the values of the first set in the second set, said digital codes being obtained by the application of the steps of:
    generating, by successive iterations, a chain of numbers, called seed numbers, from an initial psuedo-random seed number by application of a first function from a seed number to the next seed number; and
    applying a second function to each seed number of the chain to obtain each position code, the second function comprising at least one permutation followed by a bijection.

According to an embodiment, the first function is a function of iterative generation of a permutation, the result of each iteration being applied at the input of the second function.

According to an embodiment, the first function is the incrementation of an n-bit counter initialized by said initial pseudo-random seed number.

According to an embodiment, the first function and the second function are one and the same, each position code being obtained by application of said permutation followed by said bijection to the position code of previous rank.

According to an embodiment, the method further comprises, at each iteration, a test of the position code corresponding to the result of the second function at the previous rank to detect the presence of a code only comprising bits 0 or comprising a predetermined value, including at least one non-zero bit and preferably only bits at 1.

According to an embodiment, in the presence of a code only comprising bits 0, the seed number submitted to the permutation of current rank is taken as equal to said predetermined value.

According to an embodiment, in the presence of a code comprising said predetermined value, the seed number submitted to the permutation of current rank is taken as equal to the null code only comprising bits 0.

According to an embodiment, said initial pseudo-random seed number is randomly selected.

According to an embodiment, said bijection is a Gray code.

According to an embodiment, each position code is a q-bit word, where q is equal to the base-2 logarithm of the number of values contained in each set.

According to an embodiment, said permutation performs a permutation of a number of least significant bits with the same number of most significant bits, this number of bits being:
  one for a four- or fifteen-bit code;
  two for a five-, eight-, nine-, or twelve-bit code;
  three for a six-bit code;
  one or two for a seven-bit code;
  four or five for an eleven-bit code;
  two or five for a thirteen-bit code;
  four for a fourteen-bit code;
  seven for a sixteen-bit code.

An embodiment provides a generator of a permutation of a first set of values into a second set of values, comprising, for each value of the second set, a circuit of selection of a value of the first set according to a digital code and comprising a device of generation of a sequence of pseudo-random digital codes implementing a method of generation of a sequence of a sequence of pseudo-random codes, the sequence of pseudo-random digital codes generated by said generation device being applied to the selection circuits.

According to an embodiment, each seed number of said chain of seed numbers is contained in a register.

According to an embodiment, the generator implements a generation method where the first function is a function of iterative generation of a permutation, the result of each iteration being applied as an input of the second function, and comprises, between each of said registers storing the seed numbers, a circuit capable of executing the first function of iterative generation of a permutation.

According to an embodiment, the generation device comprises, for each selection circuit, a circuit of generation of a position code representative of the position of the value of the first set to be placed at the current position of the second set, said generation circuit being capable of executing the second function from the seed number associated with the current selection rank.

According to an embodiment, each generation circuit comprises a wired circuit of permutation of a portion only of the bits of the number submitted to the permutation.

An embodiment provides a circuit of compressive sensing image processing, comprising at least one generator of a permutation of a first set of values into a second set of values.

An embodiment provides a compressive sensing image sensor comprising a generator such as described.

The foregoing features and advantages, as well as others, will be described in detail in the following description of specific embodiments given by way of illustration and not limitation with reference to the accompanying drawings, in which:

FIG. 1 very schematically shows in the form of blocks an example of architecture of a compressive sensing image sensor to which the described embodiments apply as an example;

FIG. 2 very schematically shows an arbitrary example illustrating the operation of a permutation;

FIG. 3 very schematically shows in the form of blocks an embodiment of a pseudo-random permutation circuit;

FIG. 4 very schematically shows in the form of blocks, another embodiment of a pseudo-random permutation circuit;

FIG. 5 very schematically shows in the form of blocks an embodiment of a block of detection of a null value of the pseudo-random permutation circuit of FIG. 4;

FIG. 6 very schematically shows in the form of blocks, another embodiment of a pseudo-random permutation circuit;

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the generation of the random seed from which the coefficients of the permutation are calculated has not been detailed and any usual seed may be used. Further, although reference is more particularly made to an example of application to image acquisition, the described embodiments more generally apply to any pseudo-random permutation generation.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
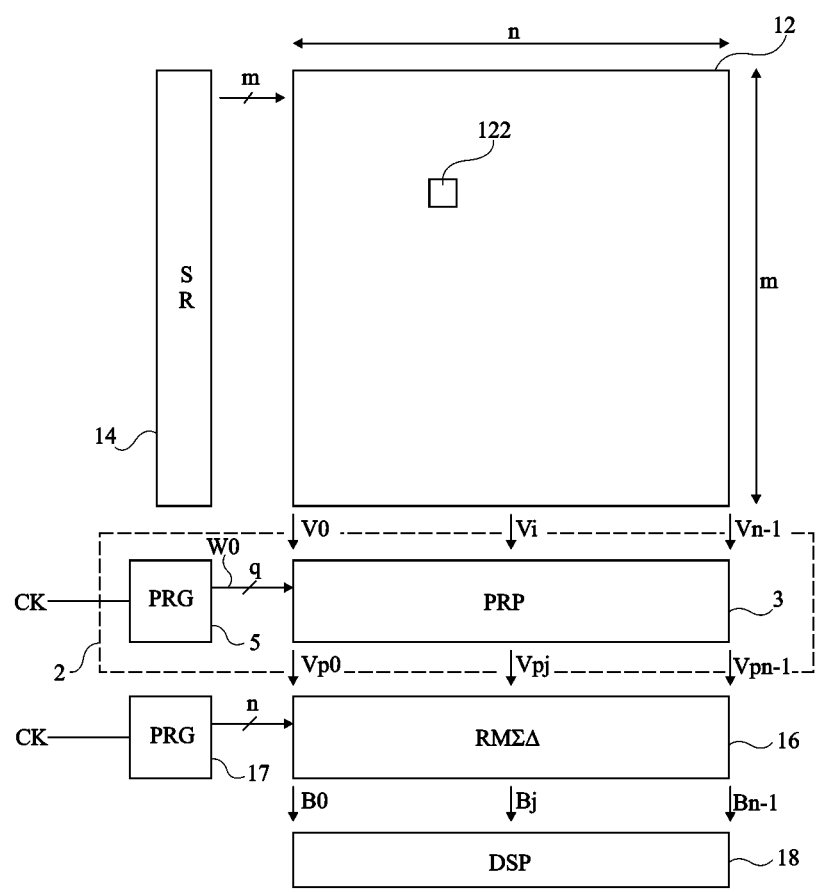

FIG. 1 very schematically shows in the form of blocks an example of architecture of a compressive sensing image sensor to which the described embodiments apply as an example.

Compressive sensing methods enable to simultaneously acquire and compress the image by providing, instead of reading and digitizing an output value representative of an illumination level individually received by each pixel, to make a plurality of non-coherent measurements, each based on a measurement support comprising a plurality of sensor pixels, for example, all the sensor pixels, or a subset of sensor pixels. Each measurement is a weighted sum of the brightness levels received by the different pixels of a measurement support. The weighting coefficients are randomly or pseudo-randomly generated. These coefficients may be binary (0 or 1), which makes the implementation of the weighted sum operations easier. To obtain a compressive effect, the total number of measurements made on the sensor is smaller than the total number of sensor pixels. It is thus possible to decrease the image acquisition time and thus the electric power consumption associated with the acquisition, particularly thanks to the fact that a less quantity of data is read and digitized by the sensor. Further, the compression processings in the digital field, subsequent to the acquisition, may be reduced or decreased due, for example, to the high entropy of the measurements generated by the compressive sensing.

The original image can be reconstructed from the compressed image and the matrix of weighting coefficients used in the acquisition. This reconstruction uses the sparseness of the original image in a specific decomposition base, for example, in a discrete cosine base or in a wavelet base.

The compressed measurements extracted by a compressive sensing may for example be directly used for classification processings without having to reconstruct the original image, as is the case in the architecture disclosed in FIG. 1.

In the example of FIG. 1, an array image sensor, for example, a CMOS sensor, comprises an array network 12 of identical pixels 122. Array 12 comprises m (for example, 256 or 512) rows and n (for example, 256 or 512) columns. The embodiments described hereafter are of course compatible with arrays having different dimensions.

The pixels 122 of the sensor may be of any type. They are, for example, active pixels, that is, each pixel comprises a photodetector and an active output amplifier formed of MOS transistors. The provision of a sensor with active pixels particularly has the advantage of enabling to acquire images having a low noise with respect to a sensor with passive pixels (that is, a sensor where each pixel comprises a photodetector but does not comprise its own output amplifier).

In the example of FIG. 1, the rows are sequentially scanned under control of a shift register 14 (SR). The reading of the sensor information is performed per column, each column delivering a voltage Vj, with j ranging from 0 (V0) to n-1 (Vn-1). Voltages Vj are submitted to a pseudo-random permutation (PRP). This permutation is performed by a circuit 2, embodiments of which will be described hereafter. Circuit 2 delivers n voltages Vpj (j in the range from 0 to n-1) to a pseudo-random generator 16 of sigma-delta type (RMΣΔ) processing the columns in parallel and which sequentially delivers binary digital values Bj (j in the range from 0 to n-1) representative of the values of the different columns to a digital processor 18 (DSP).

Circuit 2 comprises a circuit 3 of switches performing the column permutation. The permutation of the columns of the selected row is performed by circuit 3 under control of a generator 5 (PRG) of a pseudo-random number and of a sequencing signal CK. Generator 5 outputs a pseudo-random number or code W0 over a number q of bits, which is a function of the number n of columns to be permuted as will be seen hereafter.

Converter 16 also uses a pseudo-random code delivered by a generator 17 (PRG) to assign a 1 (associated with a logic 0) or a 1 (associated with a logic 1) to each information received from circuit 3 (that is, to multiply by 1 or by 1 each voltage Vpj). Generator 17 thus delivers an n-bit pseudo-random number. Generator 17 is also sequenced by signal CK.

The n bits Bj generated by circuit 16 are processed by digital processor 18, which processes the measured information.

A specificity of the architecture of FIG. 1 mainly lies in pseudo-random permutation circuit 2.

Figure 2:
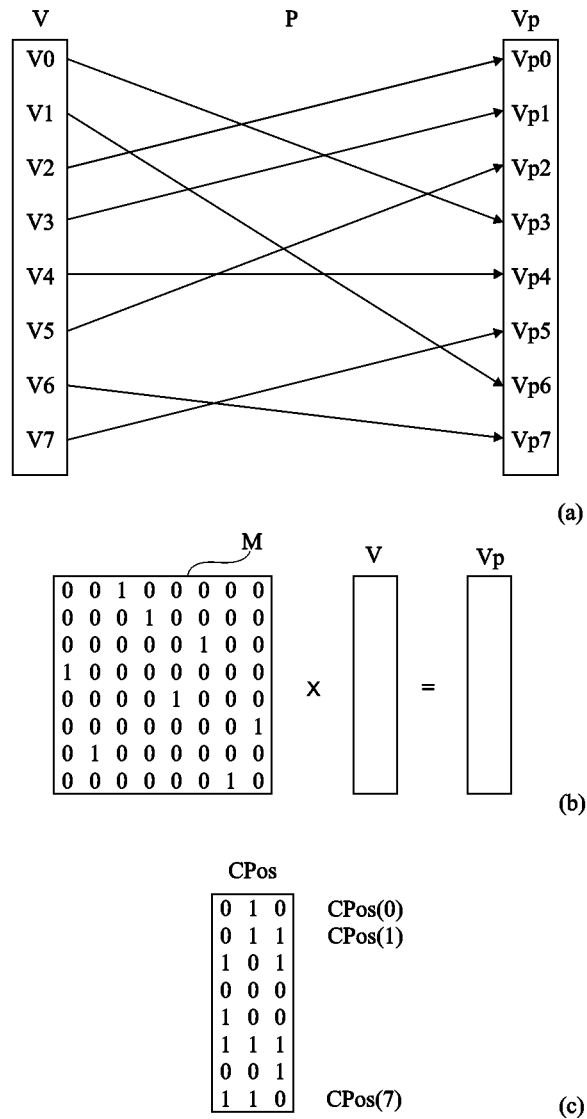

FIG. 2 very schematically shows an arbitrary example illustrating the operation of a permutation.

FIG. 2(*a*) shows two vectors V ({V0, V1, V2, V3, V4, V5, V6, V7}) and Vp ({Vp0, Vp1, Vp2, Vp3, Vp4, Vp5, Vp6, Vp7}) of eight elements each and illustrates, with arrows, a desired permutation P between these two vectors. Each arrow illustrates, for each element of vector V, into which element of vector Vp the value of the element of vector V is transferred.

The performing, by hardware or software means, of such a permutation may be based on a permutation matrix providing the correspondence between the elements of vector V and those of vector Vp.

FIG. 2(*b*) illustrates the content of such a permutation matrix M enabling to code the permutation P of FIG. 2(*a*). In other words, vector Vp may be obtained by multiplying vector V by matrix M (M*V=Vp). It is arbitrarily considered that correspondences between elements are coded by states "1". In the example of FIG. 2(*b*), the columns are associated with vector V and the rows are associated with vector Vp. Thus, the first row indicates the rank (2) of the element of vector V having a value to be placed into the element Vp0 of vector Vp, that is, the position of element V2 in the shown example. The second row indicates the rank (4) of the element of vector V having a value to be placed into element Vp1, and so on. Matrix M thus is a square matrix of n columns and n rows (here, n=8).

However, in practice, the coding of the permutation is performed by indicating, for each element of destination vector Vp, the rank in vector V where to look for the value.

FIG. 2(*c*) illustrates such a permutation coding principle. The matrix M of FIG. 2(*b*) may be expressed in the form of a vector CPos of position codes {CPos(0), CPos(1), ..., CPos(7)} having each of its elements assigned to an element of vector Vp and containing the rank, in vector V, of the value to be placed in this element of vector Vp. The size q of the elements of vector CPos depends on the size n of vectors V and Vp (n=2^q or q=Log(n)).

If the fact of passing to position codes decreases the size of the data coding the permutation, the number of codes to be stored may rapidly become significant, which generates constraints in terms of storage memory size if a plurality of permutations are to be previously stored in the memory.

According to the described embodiments, a method of on-the-fly generation of pseudo-random position code sequences is provided. This generation is based on the generation of a chain of numbers, called seed numbers Wj, from a seed, or initial seed number W0 by the iterative application of a first function, and then by the application of a second function F2 to each number to generate the codes of the sequence.

Each seed number is expressed with a number of bits identical to that used for each element of vector CPos, that is, over q nits if CPos(j) is expressed over q bits.

The second function applied to each seed number comprises at least one permutation operation followed by a bijection. Thus, from a seed number Wj, a code CPos(j) equal to F2(Wj) is obtained.

The first function F1 applied to each seed number Wj (j varying between 0 and at most n-2 or n-1) enables to define the next seed number Wj+1, and thus Wj+1=F1(Wj). Different examples of function F1 are described in further detail hereafter. In an embodiment, particularly compact, function F1 corresponds to function F2, with Wj=CPos(j−1).

Initial seed number W0 is a pseudo-random number capable of being obtained from a pseudo-random number generator, or any other means.

Figure 3:
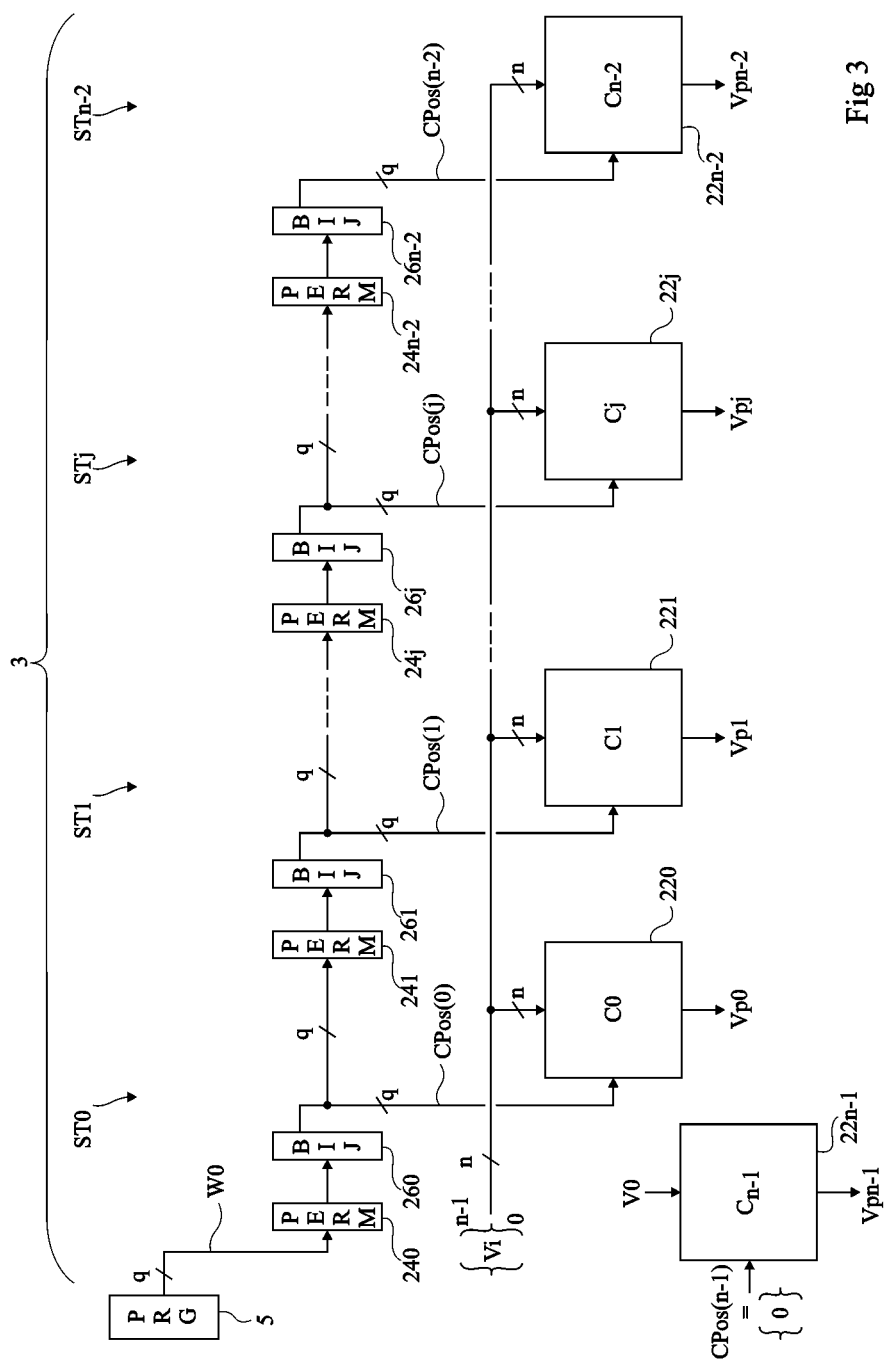
Figure 4:
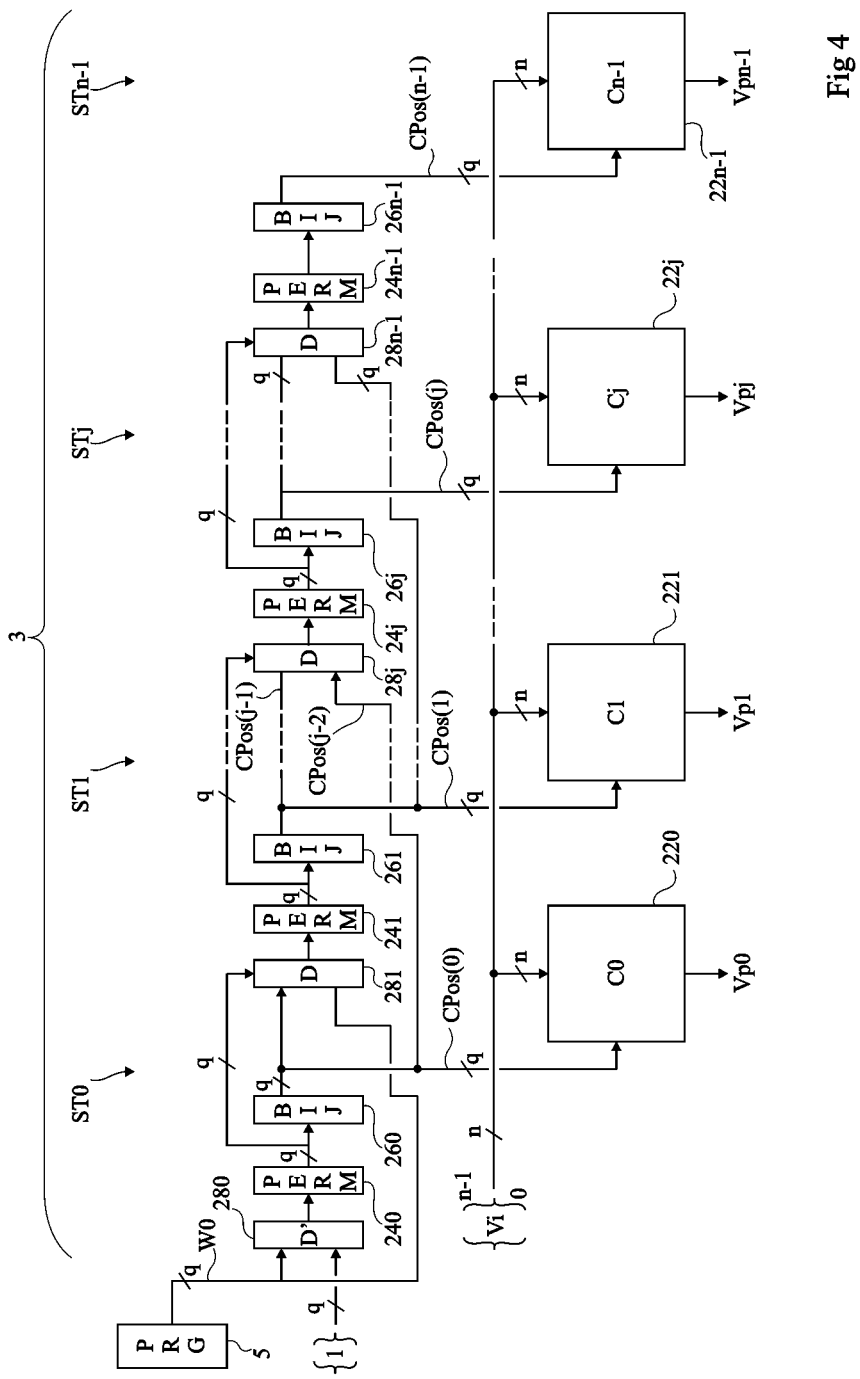

FIGS. 3 and 4 very schematically show in the form of blocks embodiments of a circuit 2 (circuit 3 and generator 5) enabling to generate a pseudo-random sequence of position codes and to apply these codes to a switching circuit in order to perform a pseudo-random permutation of vector V. In this example, the code generation is directly chained and F2=F1.

The example of FIG. 1 of a permutation of n voltages Vi into n voltages Vpj is arbitrarily considered. However, the circuit 2 described in relation with FIG. 2 more generally applies to the permutation of any vector of input values V={V0, ..., Vi, ..., Vn 1}, analog or digital, into a vector of output values Vp={Vp0, ..., Vpj, ..., Vpn 1}.

The circuit 3 illustrated in FIGS. 3 and 4 comprises n or n-1 stages STj (ST0, ST1, ..., STn 1) of identical structure. Each stage comprises a switching circuit 22j (220, 221, ..., 22j, ..., 22n 1) or Cj (C0, C1, ..., Cn 1) having the function of selecting one (and only one) of the n values V0, ..., Vi, ..., Vn 1 of vector V to be assigned to value Vpj, according to a position code CPos(j) (CPos(0), CPos(1), ..., CPos(n 1)). Each position code Cpos(j) is a q-bit word identifying the position (the rank i) of value Vi in vector V to be selected so as to be delivered as value Vpj. The number q of bits of numbers CPos(j) depends on the number n of values to be permuted. More particularly, q is such that n=2^n (2 power n), or q=Log2(n).

The set or vector CPos of position codes {CPos(0), ..., CPos(i), ..., CPos(n 1)} is such that each switching circuit 22j only selects one value Vi and that each value Vi is only selected once from among the n circuits 22j. The n switching circuits 22j perform the actual permutation. Each circuit 22j performs a position change of a value of vector V.

The generation of the n position codes CPos(j) should thus be such that each value Vj is only present once in output vector {Vp0, Vp1, ..., Vpj, ..., Vpn 1}. Further, the permutation performed from these n codes is bijective.

According to the embodiments of FIGS. 3 and 4, each code CPos(j) over q bits is generated by the application of a function PERM (blocks 24j) to the code CPos(j 1) of previous rank followed by a bijection BIJ (blocks 26j), for example, a Gray coding. The first word CPos(0) is for example, as shown in FIG. 3, generated from the random word W0 delivered by pseudo-random generator 5.

In the embodiment of FIG 3, and in particular in case of a use of a Gray coding for the bijection, the generation of number {0} (all the bits at 0) by random selection PRG will only generate identical codes {0} in the sequence. Indeed, the application of a Gray coding to number {0} provides the same number all at 0. Accordingly, in the case of a Gray code, all the position codes generated after the appearing of number {0} will have value {0}.

Thus, in the embodiment of FIG. 3, with a bijection corresponding to a Gray code, code {0}) is a forbidden code and the generator 5 used should be such that it delivers no code {0}. Thus, in this example, it is possible to only generate n-1 different code values. Thus, to perform the transformation of vector V into VP, both formed of n signals, a fixed wiring of one of the bits is performed, V0 being in this example directly coupled to Vpn-1. In other words, the n-1 last values of vector V are submitted to a psuedo-random permutation and the first value Vn-1 is still copied on Vpn-1. Further, conversely to the circuit of FIG. 4, the circuit of FIG. 3 comprises one less block ST (here, block STn-1).

To avoid this situation, and to be able to obtain n pseudo-random position codes (and not n-1), it will be desired to use code {0}. A device should however be added to the circuit to avoid for this code {0} to propagate.

FIG. 4 shows a variant of the embodiment of FIG. 3, where the generated permutation sequence includes number {0} and thus enables to generate n permutations. Circuits 28 are used for this purpose to detect at least number {0} and replace it with another number. In the example of FIG. 4, it is considered that each circuit 28j is upstream of the permutation 24j of the same stage. Another example will be described hereafter in relation with FIG. 9 where each circuit 28j is downstream of the bijection 26j of the same stage. This changes nothing to the operation as will be seen in relation with FIG. 9.

According to this embodiment, permutation function 24j does not directly receive the result of the bijection 26j-1 of the previous stage (and thus code CPos(j-1)), but the output of a function (block 28j) of detection (D) at least of number {0} and of selection between the result of the bijections 26j-1 and 26j-2 of the two previous stages. The block 280 (D') of stage ST0 is different from the other blocks 28j and receives word W0 and an arbitrarily determined value comprising at least one bit at state 1, for example, word {1} only formed of states 1. The block 281 of stage ST1 receives the output of bijection 260 and the input of block 280, and thus word W0.

The role of each block 28j is to detect the presence of number {0} at the output of the bijection 26j 1 of the previous stage STj 1 (or generated by generator 5 for stage ST0) to replace it for the generation of the current code CPos(j), with the number of the still previous stage STj2. Thus, number {0} is effectively used as a position code for stage STj 1, but is not chained to avoid stopping the sequence.

Further, to guarantee that number {0} is effectively present in the generated sequence, each block 28j further detects the presence of a non-zero predetermined value, for example, value {1} (all the bits at 1), at the output of the previous stage STj 1, to replace it for the generation of the current code CPos(j), with number {0}. Thus, code CPos(j) takes value {0} (the permutation 24 and the Gray code 26 applied to a word all at 0 provides the same word). However, since code CPos(j) is {0}, the number selected by the block 28j+1 of the next stage STj+1 will be the predetermined number (in this example, 1) of stage STj 1. Thus, the value all at 0 has been interposed in the sequence and the obtaining of a sequence of n values is made possible.

Figure 5:
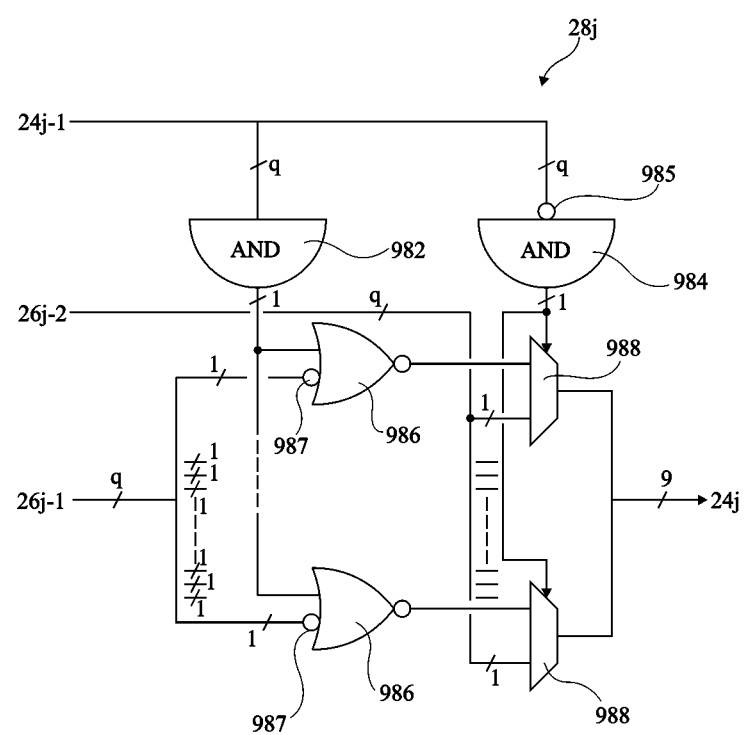

FIG. 5 shows an embodiment of a detection and selection block 28j (for j in the range from 1 to n-1).

Block 28j receives, as inputs, the outputs of blocks 24j 1, 26j 1, and 26j 2 and outputs the number to be applied to block 24j.

Each block 28 comprises two logic gates 982 and 984 respectively intended to detect the presence of the predetermined word (in this example, word {1}) and of word {0} at the output of block 24j 1. Gate 982 is an AND gate (AND) combining the q bits of the block delivered by block 24j I. Gate 984 is an AND gate (AND) combining the inverse (inverter 985) of the q bits of the word delivered by block 24j 1.

The output of gate 982 is combined, by NOR gates 986, with the inverse (inverters 987) of each of the bits of the word CPos(j 1) output by block 26j 1. Thus, if the output bit of gate 982 is 0, the output of each gate 986 delivers the corresponding bit of word CPos(j 1). The set of gates 986 thus outputs word CPos(j-1). If the output bit of gate 982 is 1 (that is, in the presence of word {1}), all the gates 986 output a state 0. The set of gates 986 thus outputs word {0}.

The output of each gate 986 is sent to the input of a two-to-one multiplexer 988, or selector, having its other input receiving the bit of corresponding rank of the word CPos(j-2) originating from block 26j-2 (or word W0 for block 981). The outputs of multiplexers 988 form the output word of the block 28j applied to the input of permutation 24j. All multiplexers 988 are controlled by the output of gate 984 and select their first input in the presence of a state 0 at the output of gate 984. Thus, in the presence of word {0}at the output of block 24j-1 (output of gate 984 at state 1), the word supplied at the output of block 28j is code CPos(j-2). In the absence of word {0} at the output of block 24j 1 (output of gate 984 at state 0) the word output by block 28j is the word output by gates 986, and thus either code CPos(j 1), or word {0} according to whether word {1} is present at stage STj 1.

As a variant, certain inputs of gate 982 are inverted to define a predetermined value different from word {1}.

For the first block 280 (D'), the detection portion of word {1} is omitted. In other words, only gate 984 (and inverter 985) and multiplexers 988 are present. The first inputs of the multiplexers receive the bits of word W0 and the second inputs of the multiplexers receive states 1. Detector 984-985) receives word W0. Thus, if word W0 is 0, block 280 outputs word {1}. In the opposite case, it outputs word W0.

The embodiment of FIG. 5 is an example only and any other circuit carrying out the same function may be used.

Figure 6:
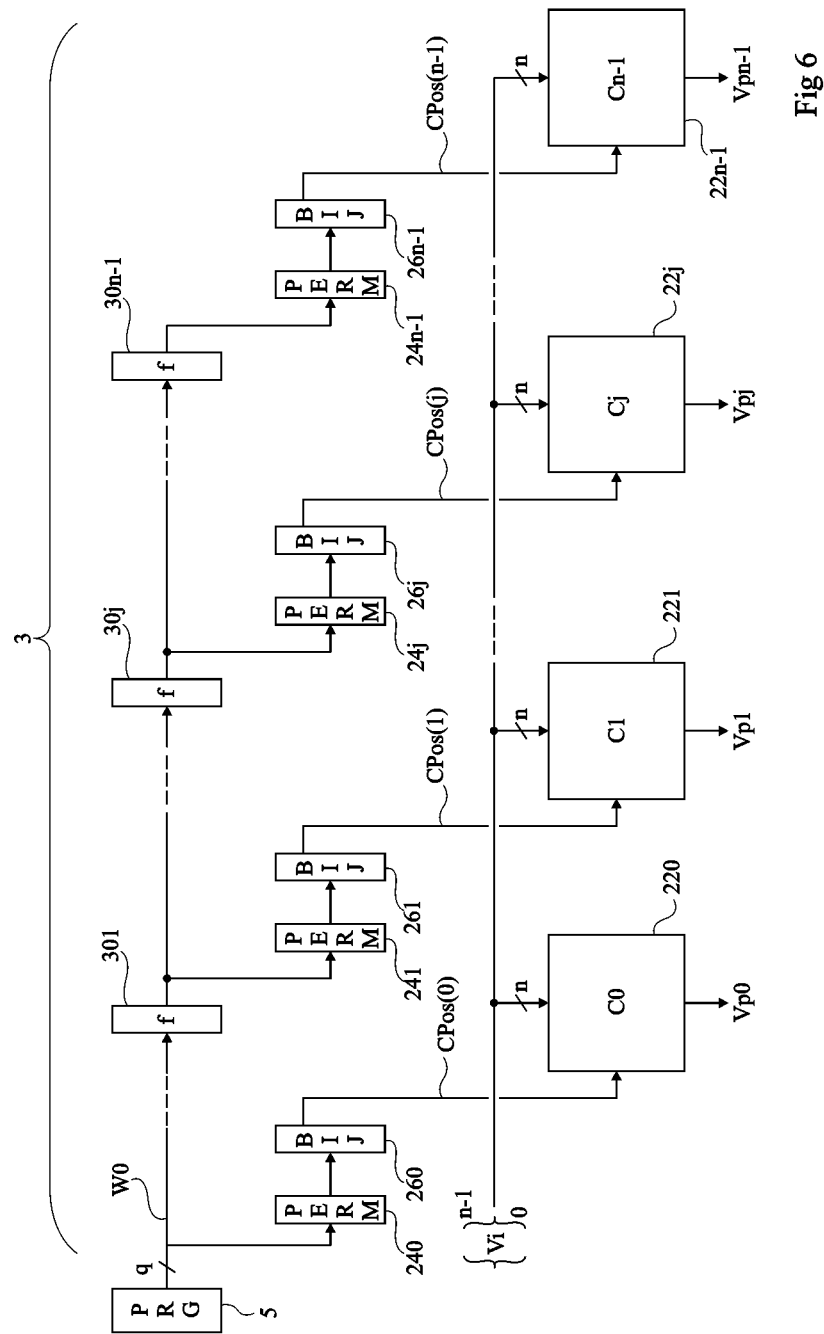

FIG. 6 shows another embodiment where the permutation and bijection functions PERM and BIJ of a current state STj are not applied to the previous position code CPos(j-1). According to this embodiment, word W0 is applied to a function f (block 30j) of iterative generation of a permutation (correspond to the above-mentioned function F1). The result of each iteration of function f is applied at the input of the permutation 24j of corresponding rank. Function f is for example the incrementation of an n-bit counter initialized by random number W0.

Thus, the structure of circuits 3 is, whatever the embodiment (FIGS. 3, 4, or 6), a structure where stages STj are, in a way, chained, each stage STj being linked to the previous state STj-1 by the position code CPos(j-1) or by the number having been used to generate the position code of this previous stage.

An advantage of such a structure is that it enables to generate position codes (and thus the permutation matrix) on the fly.

An induced advantage, as compared with usual implementations, is that it is thus not necessary to store the permutation matrix, which saves space and power consumption.

Another advantage is the simplicity of the operations carried out for the generation of the position codes. In particular, the provided structure is compatible with the implementation of function PERM by wiring and logic gates.

Figure 7:
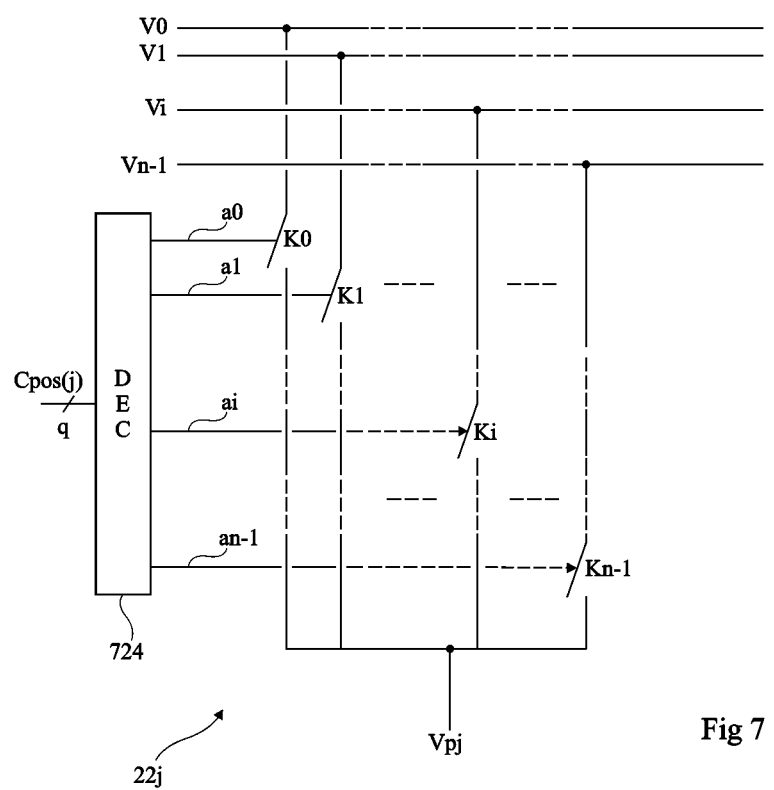
FIG. 7 shows an embodiment of a switching circuit controllable to perform permutations.

FIG. 7 shows an embodiment of a controllable switching circuit 22j for changing the position of an element of vector V.

Such a circuit comprises n switches Ki (K0, K1, . . . , Kn 1). Each switch Kj couples the input of circuit 3 receiving value Vj (V0, V1, . . . , Vn 1) to the output of the circuit 22j delivering value VPj. Each switch Kj is controlled by a bit aj (a0, a1, . . . , an 1), extracted, by a decoder 724 (DEC) of the code CPos(j) of rank j. The role of decoder 724 is to interpret the code CPos(j) having a value equal to the rank i of switch Ki to be turned on in order to perform the permutation.

Figure 8:
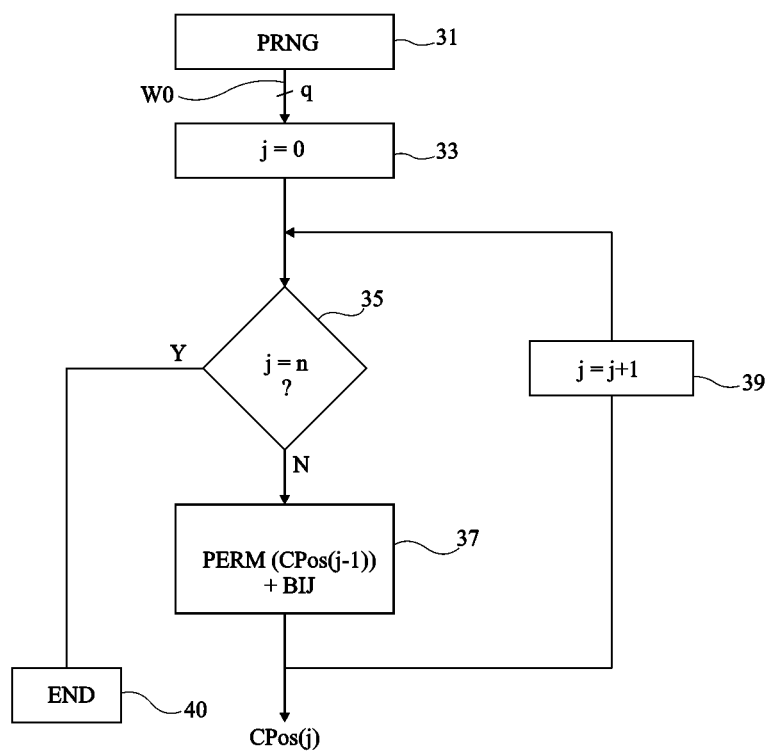
FIG. 8 is a block diagram illustrating an implementation mode of a method of generation of position codes for a permutation, based on the embodiment of FIG. 3.

FIG 8. is a block diagram illustrating an implementation mode of a method of generation of position codes CPos(j) for a permutation according to the embodiment of FIG. 3.

It is started by generating a pseudo-random number W0 over q bits (block 31, PRNG).

A loop processing is then performed over all the values j from 0 to n-1. For this purpose, a counter j is initialized (block 33, j=0). As long as all the values of j have not been processed (output Y of a block 35, j=n?), one applies (block 37, PERM(CPos(j-1))+BIJ)) a predefined permutation PERM of the bits of pseudo-random word of previous rank CPos(j-1), followed by a bijection BIJ (for example, a Gray coding), to obtain a position code CPos(j). In the initial case, where j is equal to 0, the pseudo-random word of previous rank is taken as equal to pseudo-random W0.

At each iteration, the next position code CPos(j) is generated in this manner. This operation is repeated (incrementation of rank j, block 39, j=j+1) as long as there remain values j to be processed. Once all the position codes have been processed (output Y of block 35), the method stops (block 40, END) for this permutation.

Figure 9:
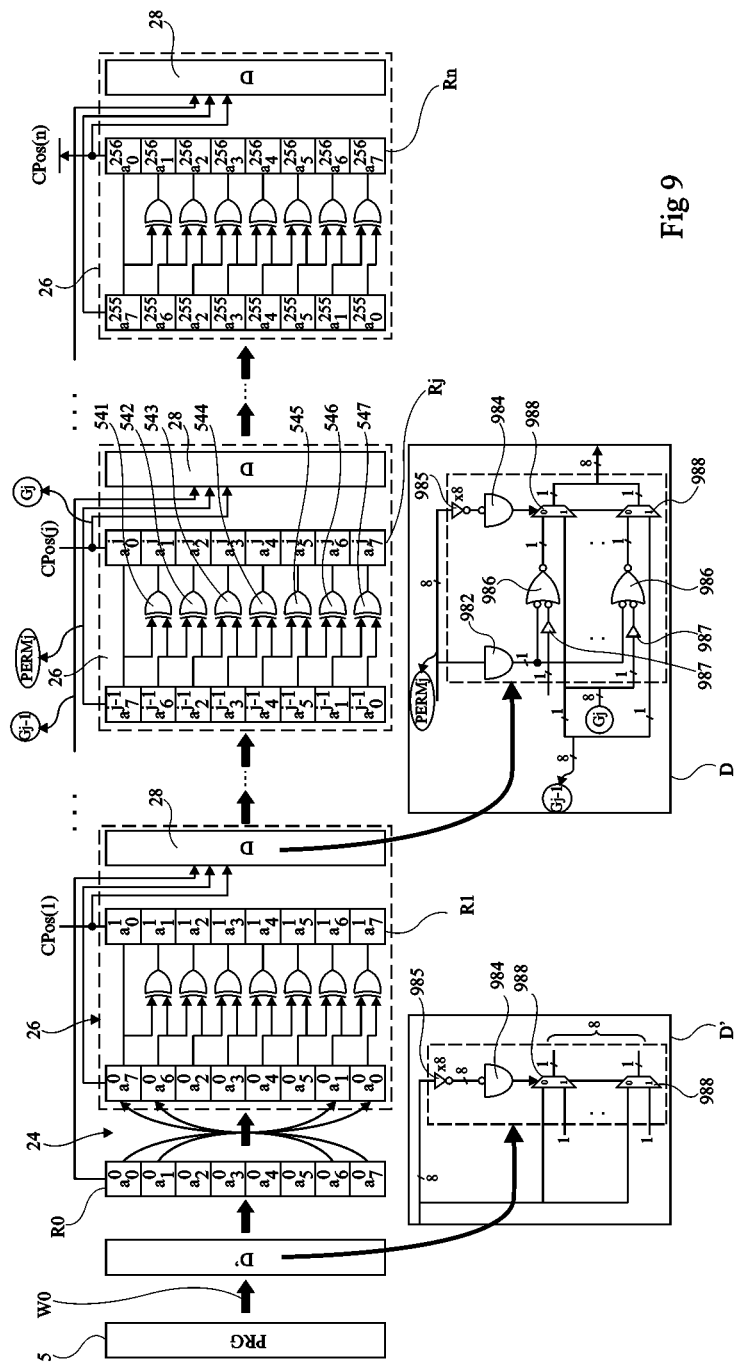
FIG. 9 schematically shows an embodiment of a circuit of on-the-fly generation of permutation codes for a vector of 256 values, based on the embodiment of FIG. 4.

FIG. 9 schematically shows an embodiment of a circuit for generating, on the fly, the permutation codes CPos(j) of values of 256 columns.

The representation of FIG. 9 illustrates an example of contents of registers Rj containing the words representative of position codes CPos(j). In other words, the content of each register Rj identifies the rank i of the value Vi to be delivered as value VPj.

FIG. 9 illustrates, as compared with FIG. 4, a variant according to which it is considered that block 28 of detection and selection of rank j is at the output of the corresponding stage rather than at its input. This changes nothing to the operating principle. Further, in FIG 9, index j ranges from 1 to n (instead of from 0 to n-1 in FIG. 4). In the example of FIG. 9, it is assumed that the n stages (from 1 to n) are structurally identical but a block D'is used upstream of stage ST1. In the embodiment of FIG. 4, stage ST0 is different in that it contains block D', but a block D, unused in the embodiment of FIG. 9, is spared in stage n.

In FIG. 9, the result of the application of the Gray code (block 26) to the result, noted PERMj, of the permutation (block 24) applied at the output of block 28 of the stage of previous rang, is noted Gj. For simplification, only one permutation 24 has been shown.

FIG. 9 also illustrates an embodiment of blocks D'and D corresponding to the implementation of FIG. 5.

In the example of FIG. 9, a permutation between 256 (n=256) is assumed, and words CPos(j) are thus over 8 bits (q=8). The bits of codes CPos(j) are noted a(k, j), where k (in the range from 0 to q) designates the rank of the bit of code CPos(j) and where j designates the rank of the value Vpj of output vector {Vp1, . . . , Vpj, . . . , Vpn}. Notation a(k, j) is noted in FIG. 9: $a_k^j$.

The word W0 output by generator 5 (PRG) is submitted to block D'.

Thus, the word output by block D'and contained in register R0 is: $\{a_0^0, a_1^0, a_2^0, a_3^0, a_4^0, a_5^0, a_6^0, a_7^0\}$ The operation 24 (PERM) applied to a word of rank j to obtain rank j+1 comprises permuting the two most significant bits with the two least significant bits. $\{a_7^0, a_6^0, a_2^0, a_3^0, a_4^0, a_5^0, a_1^0, a_0^0\}$ at the end of step 24.

More generally, the word CPos(j) at the output of the permutation of rank j applied to the bijection represents the result of the application of the function D of rank j-1 and is noted: $\{a_7^{j-1}, a_6^{j-1}, a_2^{j-1}, a_3^{j-1}, a_4^{j-1}, a_5^{j-1}, a_1^{j-1}, a_0^{j-1}\}$ Step 26 comprises applying a bijection to the bits originating from permutation PERM to obtain word CPos(j). This operation is for example the application of a Gray code, performed by a logic circuit based on XOR-type gates 54k (541, 542,543, 544, 545, 546, 547) (with k ranging from 2 to q). Each gate 54k combines two by two the successive bits of the intermediate word resulting from step 24 to deliver bit a(k, j), bit a(0, j) simply being the result of step 24, that is, the content of bit a(7, j 1).

Thus, the bits a(k, j) of word CPos(j) respectively are:
a(0, j)=a(7, j 1),
a(1, j)=the result of the XOR combination of bit a(7, j 1) with bit a(6, j 1),
a(2, j)=the result of the XOR combination of bit a(6, j 1) with bit a(2, j 1),
a(3, j)=the result of the XOR combination of bit a(2, j 1) with bit a(3, j 1),
a(4, j)=the result of the XOR combination of bit a(3, j 1) with bit a(4, j 1),
a(5, j)=the result of the XOR combination of bit a(4, j 1) with bit a(5, j 1),
a(1, j)=the result of the XOR combination of bit a(5, j 1) with bit a(1, j 1), and
a(7, j)=the result of the XOR combination of bit a(1, j 1) with bit a(0, j 1).

The permutation function 24 illustrated by FIG. 9 may be modified according to different variants, provided to respect the condition that each word CPos(j) identifies the position of a state 1 in a switching or permutation matrix 22j, and provided for this position to be present only once among the n codes CPos(j).

An advantage of the described pseudo-random permutation generation mechanism is that it is compatible with a hardware implementation with connections of outputs of a register to the input of another register and of the logic gates.

Another advantage is that the hardware cell for performing the permutation of a rank is the same for all ranks. Thus, in applications compatible with an on-the-fly generation of the position codes, the permutation circuit may comprise one hardware cell only, reused in a loop.

An advantage of the described embodiments is that the permutation is particularly simple to implement in hardware fashion by circuits in wired logic. Such an implementation is compatible with needs for rapidity of generation of permutations when the latter are generated on the fly.

The number of bits which have been permuted, that is, submitted to the position inversion of step 24, depends on the size q of words CPos(j), and thus on the size n of the vectors of values. This number should be respected to preserve the feasibility of a chained generation of the position codes and guarantee a permutation of values V into Vp.

The following table sums up the number of least significant bits (columns of table 1) capable of having their position permuted at step 24 with most significant bits of the word, according to the number q of bits (rows of table 1). This table has been established empirically. For certain values of q, a plurality of bits may be permuted.

TABLE 1

|    | 1 | 2 | 3 | 4 | 5 | 6 | 7 |
|----|---|---|---|---|---|---|---|
| 4  | X |   |   |   |   |   |   |
| 5  |   | X |   |   |   |   |   |
| 6  |   |   | X |   |   |   |   |
| 7  | X | X |   |   |   |   |   |
| 8  |   | X |   |   |   |   |   |
| 9  |   | X |   |   |   |   |   |
| 10 |   |   |   |   |   |   |   |
| 11 |   |   |   | X | X |   |   |
| 12 |   | X |   |   |   |   |   |
| 13 |   | X |   |   | X |   |   |
| 14 |   |   |   | X |   |   |   |
| 15 | X |   |   |   |   |   |   |
| 16 |   |   |   |   |   |   | X |

Other types of permutations can be envisaged by permuting other bits than the most significant bits with least significant bits, while respecting criterion of a permutation, that is, all the values of the input vector are present in the output vector.

A pseudo-random permutation mechanism such as described hereabove has multiple applications.

It may be used not only in image processing applications, but also in applications of cryptography, time-domain permutations and, more generally, for any application where it is desired to generate on the fly pseudo-random permutations of a vector of same size in a simple, surface area and energy saving manner.

Various embodiments and variants have been described. Those skilled in the art will understand that certain features of these various embodiments and variants may be combined, and other variants will occur to those skilled in the art. In particular, the selection of the bijection operation may vary. This does not modify the principle of chaining of the position codes from a first value to perform a permutation, the disclosed conditions (number of permuted most and least significant bits) according to the size of the codes remain valid to guarantee a permutation.

Finally, the practical implementation of the embodiments and variants described herein is within the capabilities of those skilled in the art based on the functional indications provided hereinabove.

What is claimed is:

1. Method of generation, on the fly, of a sequence of pseudo-random digital codes, comprising the steps of:
generating a first set of values from a first set of voltages;
generating, by successive iterations, a chain of numbers, called seed numbers, from an initial pseudo-random seed number by application of a first function from a seed number to the next seed number;
applying a second function to each seed number of the chain of numbers to obtain a same number of position codes to provide digital codes, the second function comprising at least one first wired logic permutation followed by a bijection;
generating a second set of voltages from said digital codes, said digital codes representing respective positions of the values from the first set of voltages in the second set of voltages and allowing the performing, by a switching circuit, of a second permutation of the values from the first set of voltages in the second set of voltages.

2. Method of compressive image acquisition from an array image sensor, comprising the steps of:
sequentially scanning rows of the array image sensor to perform, at each row, a parallel reading of information per column, each column delivering a voltage, wherein a first set of voltages delivered by the columns define a first set of values;
submitting the set of voltages delivered by the columns to a pseudo-random permutation performed by a switching circuit operatively connected to the array image sensor to deliver a second set of voltage values,
wherein the pseudo-random permutation is performed from digital codes representative of positions of the first set of values in the second set of voltage values, said digital codes being obtained by on the fly application of the steps of:
generating, by successive iterations, a chain of numbers, called seed numbers, from an initial pseudo-random seed number by application of a first function from a seed number to the next seed number; and
applying a second function to each seed number of the chain of numbers to obtain a same number of position codes, the second function comprising at least a first permutation followed by a bijection, the pseudo-random permutation representing a second permutation.

3. Method according to claim 1, wherein the first function is a function of iterative generation of the first wired logic permutation, the result of each iteration being applied to an input of the second function.

4. Method according to claim 3, wherein the first function is an incrementation of an n-bit counter initialized by said initial pseudo-random seed number.

5. Method according to claim 1, wherein the first function and the second function are one and the same, each position code being obtained by application of said first wired logic permutation followed by said bijection to the position code of previous rank.

6. Method according to claim 5, further comprising, at each iteration, a test of the position code corresponding to a result of the second function at the previous rank to detect the presence of a code only comprising bits 0 or comprising a predetermined value, including at least one non-zero bit and preferably only bits at 1.

7. Method according to claim 6, wherein, in the presence of a code only comprising bits 0, the seed number submitted to the first wired logic permutation of current rank is taken as equal to said predetermined value.

8. Method according to claim 6, wherein, in the presence of a code comprising said predetermined value, the seed number submitted to the first wired logic permutation of current rank is taken as equal to a null code only comprising bits 0.

9. Method according to claim 5, wherein said initial pseudo-random seed number is randomly selected.

10. Method according to claim 1, wherein said bijection is a Gray code.

11. Method according to claim 1, wherein each position code is a q-bit binary word, where q is equal to a base-2 logarithm of the number of values contained in each set of the first and second set of voltages.

12. Method according to claim 1, wherein each seed number is coded with the same number of bits as the position codes.

13. Method according to claim 1, wherein said first wired logic permutation performs a permutation of a number of least significant bits with the same number of most significant bits, this number of bits being:
one for a four- or fifteen bit-code;
two for a five-, eight-, nine-, or twelve-bit code;
three for a six-bit code;
one or two for a seven-bit code;
four or five for an eleven-bit code;
two or five for a thirteen-bit code;
four for a fourteen-bit code;
seven for a sixteen-bit code.

14. Generator of a permutation of a first set of voltages into a second set of values, comprising, for each value of the second set of values, a selection circuit of a value of the first set of voltages according to a digital code and comprising a generation device of a sequence of pseudo-random digital codes implementing a generation method according to claim 1, the sequence of pseudo-random digital codes generated by said generation device being applied to the selection circuits and the sequence of pseudo-random digital codes representing the respective positions of the values of the first set of voltages in the second set of voltages.

15. Generator according to claim 14, wherein each seed number of said chain of numbers is contained in a register.

16. Generator according to claim 15, comprising, between each of said registers storing the seed numbers, a circuit capable of executing the first function of iterative generation of a permutation, wherein the first function is a function of iterative generation of the first wired logic permutation, the result of each iteration of the first function being applied to an input of the second function.

17. Generator according to claim 14, wherein the generation device comprises, for each selection circuit, a generation circuit of a position code representative of the position of the value of the first set to be placed at the current position of the second set, said generation circuit being capable of executing the second function from the seed number associated with a current selection rank.

18. Generator according to claim 17, wherein each generation circuit comprises a wired permutation circuit that only permutes a portion of bits submitted to the wired permutation circuit.

19. Circuit of compressive sensing image processing, comprising at least one generator according to claim 14.

20. Compressive sensing image sensor comprising a generator according to claim 14.

* * * * *